United States Patent [19]

Dwin et al.

[11] Patent Number: 5,517,612
[45] Date of Patent: May 14, 1996

[54] DEVICE FOR SCALING REAL-TIME IMAGE FRAMES IN MULTI-MEDIA WORKSTATIONS

[75] Inventors: David R. Dwin, Carrboro; William R. Lee, Apex; David W. Nuechterlein, Durham, all of N.C.; Joseph M. Pennisi, Coconut Creek; Paul S. Yosim, Boca Raton, both of Fla.

[73] Assignee: International Business Machines Corporation, Armonk, N.Y.

[21] Appl. No.: 153,004

[22] Filed: Nov. 12, 1993

[51] Int. Cl.⁶ .................................................. G06F 12/06
[52] U.S. Cl. .................... 395/166; 395/164; 395/163; 345/185; 348/715; 348/718
[58] Field of Search .................................. 395/162–166, 395/139, 154, 157; 345/119, 120, 127, 185, 201, 203; 348/715, 718, 719, 443, 446, 448, 456, 455, 561, 581

[56] References Cited

U.S. PATENT DOCUMENTS 4,947,257  8/1990  Fernandez et al. ............... 348/715

FOREIGN PATENT DOCUMENTS

| 0384419 | 2/1990 | European Pat. Off. | ......... G09G 1/16 |
| 0493881 | 11/1991 | European Pat. Off. | ......... G09G 5/00 |
| 9321574 | 4/1993 | WIPO | ............................. G06F 3/14 |

Primary Examiner—Mark R. Powell
Assistant Examiner—Kee M. Tung
Attorney, Agent, or Firm—Joscelyn G. Cockburn

[57] ABSTRACT

An adapter for use in a multi-media workstation includes a device which accepts real-time video information at a first size, reduces the size to a selected one of a plurality of available sizes and places the reduced real-time video information into a selected area of the video memory of a computer graphic display device. Thereafter, the scaled real-time video information is displayed with other computer graphics applications, in a sub-window of the screen of the display device.

21 Claims, 10 Drawing Sheets

SETPS IN VERTICAL SCALING

INPUT  STEP 1  STEP 2

INPUT  STEP 3  STEP 4

SAMPLE FORMULAS TO INITIALIZE SCALING PARAMETERS

| ALGORITHM<br>PARAMETERS | FRAME<br>BASED<br>(1) | FIELD<br>BASED<br>(2) | DISCARD<br>FIELD<br>(3) | KEEP<br>FIELD<br>(4) |
|---|---|---|---|---|
| INCR (EVEN) | SF | SF | 2XSF | 1 |
| INCR (ODD) | SF | SF | 0 | 2x(SF-.5) |
| SEED (EVEN) | 1-INCR<br>(EVEN) | 1-INCR<br>(EVEN) | 1-INCR<br>(EVEN) | 0 |
| SEED (ODD) | 0 | FRAC<br>(SEED(EVEN)<br>+.5) | 0 | FRAC<br>(SEED(EVEN)<br>+.5) |
| DOUBLE ACCUMULATE FLAG | T | F | F | F |

FRAME BASED SCALING

FIELD BASED SCALING

DISCARD ENTIRE FIELD

DEVICE FOR SCALING REAL-TIME IMAGE FRAMES IN MULTI-MEDIA WORKSTATIONS

BACKGROUND OF THE INVENTION

1. Field of the Invention

The present invention relates to workstations in general and, in particular, to multi-media workstations in which full motion video images and computer generated information (graphic and non-graphic) are shown on displays.

2. Prior Art

The proliferation of multi-media workstations create the need for new techniques and/or devices to process multi-media information. Generally, the multi-media workstation is capable of processing electrical signals representative of voice, data and video information. As a general proposition, the different types of information (i.e., data, voice or video) are propagated on a common transmission medium.

A conventional workstation is comprised of a controller which is usually a personal computer (PC) and one or more Input/Output (I/O) devices. The I/O devices may include printers, displays, etc. Probably, the display unit is the most important of all the I/O devices. It gives a user a visual image of information inputted into the system and results based upon queries from the user. A conventional device, commonly known as a video adapter, couples the display device to the bus of the PC. An operating system such as OS/2$^R$ is executed on the PC and provides the necessary facilities (e.g., interfaces, protocols, format, etc.) for providing information on the display via the video adapter. The OS/2$^R$ product partitions the display screen into separate areas or windows in which selected information can be inserted and displayed to the user.

It is desirable for multi-media applications to display full motion video simultaneously with conventional computer graphic information in a windowing environment. Many primary sources of full motion video are in a format known as National Television Standards Committee (NTSC). An NTSC video image is composed of successive frames. Each frame consists of an interlaced odd and even field. Each field has 262.5 scan lines, 240 of which contain video information. Therefore, each frame has 480 interlaced lines of video information.

To integrate the 480 lines of video information with computer graphics in a windowing environment, requires scaling the video image into a size which fits into a window of user defined height. In addition to scaling, the interlaced image has to be de-interlaced in order to be displayed in the window environment.

One known scaling technique is decimation. In this technique, information is decimated (discarded) on a field basis, providing a maximum of 240 scaled window heights. When information is decimated on a field basis, both the even and the odd field are treated alike, save for a possible offset between the two, and the same number of lines of video information are discarded from each field. Field based scaling via decimation is likely to introduce decimation artifacts. The decimation artifacts reduce the output image quality when key visual cues in the input image are fully discarded in the scaled output image.

U. S. Pat. No. 4,947,257 describes a system for combining a plurality of video signals with still imagery such as text or graphics for display on a high definition (HD) TV. The video signals are scaled in order to fit into particular windows of a display screen. The scaling is done by a processor executing a vertical and horizontal cubic spine interpolation algorithm.

SUMMARY OF THE INVENTION

It is a main object of the present invention to provide an adapter with improved functions for scaling full motion video information.

It is another object of the present invention to provide a video adapter with a plurality of different scaling modes. Each mode is programmable, provides different window heights and better image quality than has heretofore been possible.

The video adapter includes a memory buffer with a designated area corresponding to regions on the computer display screen. The designated area contains data for displaying on the screen. A graphic control module including a control microprocessor interconnects the memory buffer to the bus of a host system, such as a PC. A conversion module for providing a mapping function and converting digital RGB or YUV signals to analog RGB signals interconnects the memory buffer to the display. A module (called Video Integration Processor) for processing full motion video is coupled to a node intermediate to the graphic control module and the memory buffer. The module includes a scaling device which treats interlaced full scale TV video image as if it were a contiguous frame containing two (hereinafter called odd and even) fields. The device simultaneously selects current lines, to be displayed, from a presently received (say even) video field and future lines, to be displayed, from the other (say odd) video field to be received subsequently. The device places current lines selected from a presently received video field into the video buffer and reserves spaces in the video buffer for the future lines in the other video field to be received later. Upon arrival of the other video field, the selected lines are stored in the respective reserved spaces. The non-selected lines in the odd and even fields are discarded.

In particular, the scaling device or scaler is comprised of circuit components including a plurality of registers for storing seed or initial values representative of a desired scaling factor. The selected values are loaded under program control. A counting means for combining selected ones of the registers includes a pair of selector circuits coupling the input of an adder circuit to the registers and respective ones of a pair of series connected selector/accumulator interconnecting the output of the adder to designated ones of the pairs of selector circuits. An overflow (carry out) terminal of the adder is coupled to a pair of flag registers and a controller generates control signals which enable respective ones of the circuit components at selected time intervals. The state of the flag registers indicates which lines from the current field and the adjacent field are to be kept.

In one embodiment of the invention, a double accumulation method is used in processing full scale video information. As a result of the double accumulation process, the quality of the resulting video image is superior to video image produced by other techniques. Simply stated, the double accumulation process adjusts (adds) the contents of the accumulator twice with contents of selected increment values for each video line received and processed. This gives an effect as if a progressive frame of video information was being received even though only one field of the frame is being received at a time.

BRIEF DESCRIPTION OF THE DRAWINGS

FIGS. 4, 4A and 4B show the multi-media scaling circuitry according to the teachings of the present invention.

FIG. 6 shows sample formulas to be used to program pertinent registers of the scaling device.

DETAILED DESCRIPTION OF THE PREFERRED EMBODIMENT

Figure 1:
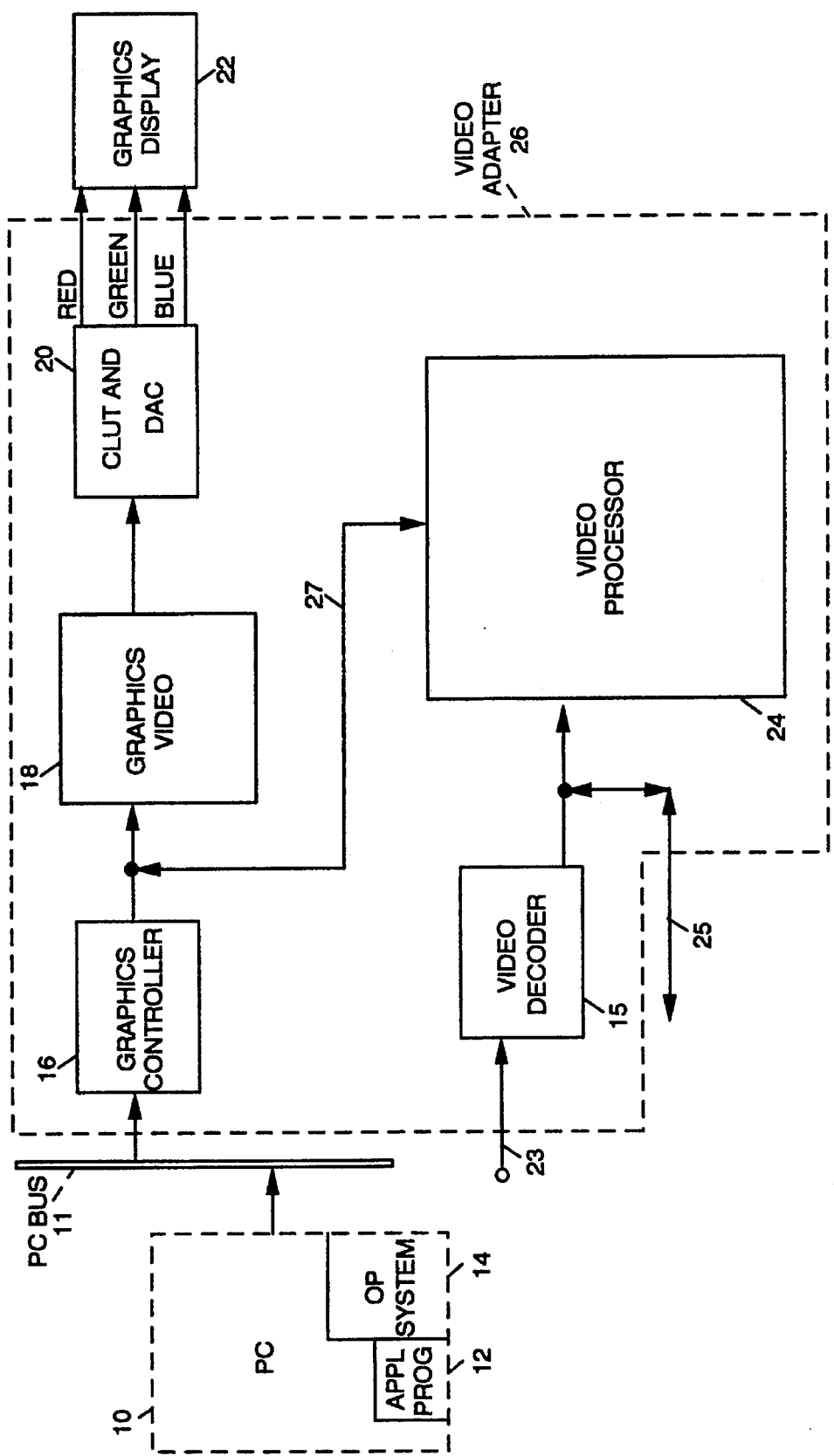
FIG. 1 shows a block diagram of a system, such as a multi-media workstation, according to the teachings of the present invention.

FIG. 1 shows a system diagram including the teachings of the present invention. The system includes a personal computer (PC) 10 with its PC bus 11 shown externally for purposes of description. A video adapter 26 is coupled to PC bus 11 and provides scaled real time television images which are displayed simultaneously with computer graphics and/or text data on a conventional graphics display means 22. The PC 10 executes an operating system 14 which provides multitasking functions and windowing on the graphic display in which the video image and/or the graphics or text data is displayed. Any conventional multitasking operating system such as OS/2$^R$ can be used in PC 10 to provide the multitasking environment and the windowing partitioning of the graphics display 22. In addition, an application program 12 which is a user provided item, is executed in PC 10 on top of the operating system 14. As will be explained subsequently, the application program can be used for loading predetermined values in a scaling device (to be described subsequently) which runs in video processor 24.

Still referring to FIG. 1, the video adapter 26 includes graphics controller 16, graphics video buffer 18, color look-up table/digital to analog converter (CLUT/DAC) means 20, video decoder means 15, and video processor 24. The interconnection of the named units are shown in FIG. 1 and, for brevity, will not be repeated. The graphics controller 16 can be purchased as a standard item. It attaches to a system bus, such as PC bus 11 and allows (and/or assists) an application program, such as 12 running in the PC 10, to alter the contents of the graphics video buffer 18 and to control the operation of video processor 24.

The graphics video buffer (GVB) 18 is a memory buffer wherein a large portion of the data corresponds to regions of the graphic display screen 22. The area of the memory buffer that contains the graphics and/or video data is commonly referred to as frame buffer. The color look-up table/digital to analog converter (CLUT/DAC) 20 provides a final mapping from the particular frame buffer representation into an analog RGB signal necessary to drive the graphics display 22. The video decoder 15 is a standard device which decodes a composite or S video signal into analog RGB or YUV, and then digitizes it to produce a digital RGB or YUV representation of the signal on its output. The video signal on terminal 23 can be provided in the NTSC or PAL (phase alternation line) format. In addition to the video image on terminal 23, a decompressed video image from a codec (compression/decompression) source (not shown) can also be provided on terminal 25. The video image on terminal 25 or the video image outputted from the video decoder 15 is forwarded to video processor 24. The video processor 24 is interconnected by bidirectional bus 27 to the graphic controller 16 and the graphic video buffer 18. As will be explained in greater detail hereinafter, the video processor 24 receives real time video images, crops the image horizontally and vertically, scales the image horizontally and vertically and converts the image data to the desired color space (RGB to YUV or YUV to RGB). The video processor then transfers the scaled/color space converted image into the correct location within the frame buffer for display on the graphics display screen 22.

Based on the above description, it can be concluded that video input signals from a TV tuner, video, tape recorder, or video camera presented in NTSC or PAL standard format or as a decompressed video stream from a video codec are processed including scaling by video processor 24 and are displayed in an adjustable size window on computer graphic display screen 22 simultaneously with other graphics or text data on the display.

Figure 2A:
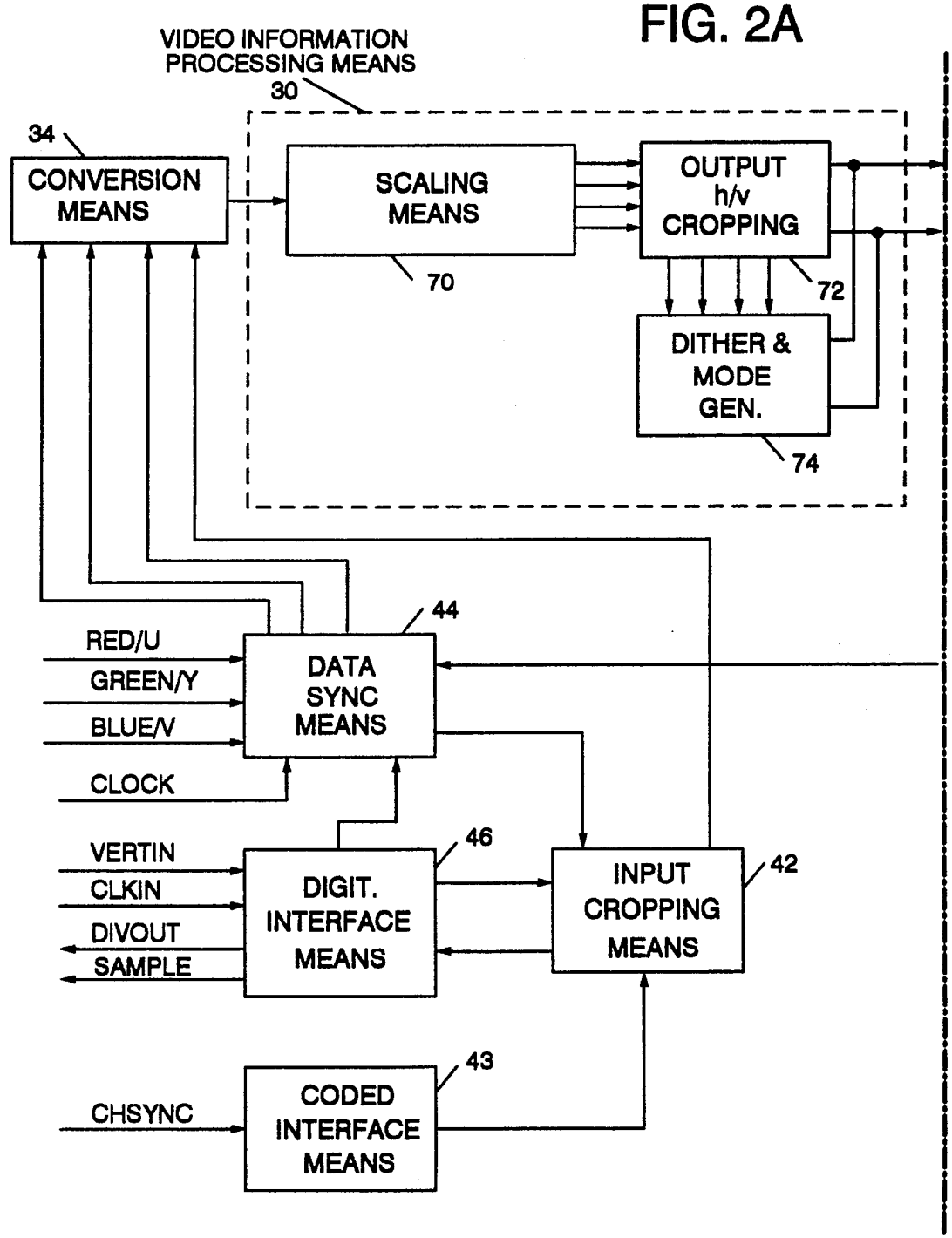
FIGS. 2, 2A and 2B shows a block diagram of a video processor module used in FIG. 1 to process full motion videos.
Figures 2, 2B:
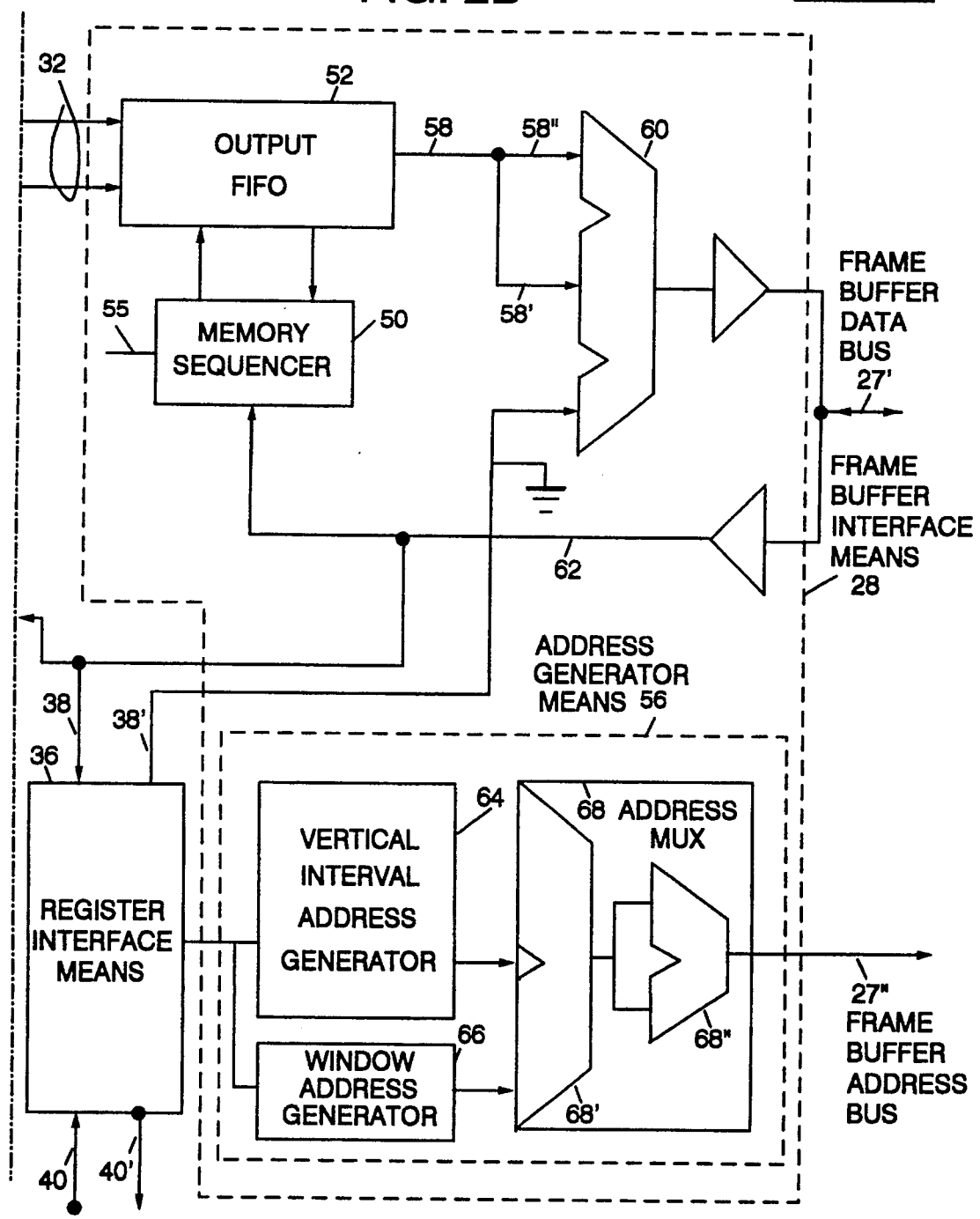

FIGS. 2A and 2B show a detailed block diagram of video processor 24. As described previously, the video processor processes video information and places the information in selected areas of the video buffer from whence the information is displayed in selected windows of the computer graphics display screen 22. As is used in this document, process means the "video processor" prepares the video information so that it can be displayed on the video screen simultaneously with computer generated graphics/data information.

The video processor 24 includes frame buffer interface means 28 (FIG. 2B) which is coupled to the frame buffer via frame buffer data bus 27' and frame buffer address bus 27" It is worthwhile noting that the data bus 27' and the address bus 27" are identified in FIG. 1 by numeral 27. The frame buffer interface means 28 provides the facility and function through which high speed video information is inserted in selected areas of the video buffer 18 (FIG. 1). The video information processing means 30 (FIG. 2A) receives the high speed video information from conversion means 34, processes the information and transmits it via bus 32 to the frame buffer interface means 28. The register interface means 36 is connected via bus 38 and 38' to the frame buffer interface means 28. Access into the register interface means 36 is obtained via data bus 40 and 40' respectively. The video information into conversion means 34 is provided over respective conductors from input cropping means 42 and data synchronization means 44. Information into the data synchronization means 44 is provided via digitized interface means 46 and data into the input cropping means 42 is provided over conductors from codec interface means 43 and digitized interface means 46. Signals into and out of the data synchronization means 44, digitized interface means 46 and codec interface means 43 are shown by respective arrows and are labeled accordingly.

Still referring to FIGS. 2A and 2B, the frame buffer interface means 28 includes memory sequencer 50 which is connected to output FIFO 52. The memory sequencer 50 is enabled, via a control signal on terminal 55, to control or manage the memory interface means. The signal on terminal 55 is provided by the graphics controller means 16 (FIG. 1).

To this end, the memory sequencer 50 provides all direct memory control signals along with control for the reading of the output FIFO buffer 52 and the advancing of addresses via the address generating means 56 (to be discussed subsequently). The output from the output FIFO buffer 52 is fed over bus 58, busses 58' and 58" to multiplexor means 60. The output from multiplexor 60 is fed over the buffer data bus 27'. Another input to multiplexor means 60 is fed over bus 38' from register interface means 36 (details of which will be given hereinafter). The output FIFO buffer 52 buffers video data which is held until the memory sequencer 50 gains control or access to the video buffer via the frame buffer interface means 28. Once access or control is obtained, the contents of the output FIFO buffer 52 is transmitted into frame buffer or graphics video buffer 18 (FIG. 1).

The address generator means 56 (FIG. 2B) comprises vertical interval address generator 64 and window address generator 66. The output signals from each of the generators are fed into address multiplexer means 68. The address multiplexor means 68 is comprised of two multiplexor means 68' and 68" connected in tandem. The window address generator 66 provides the addresses necessary to write the line-video window data into the graphics video buffer 18.

The vertical internal address generator 64 provides the addresses necessary to write a captured vertical blanking internal data stream to the graphics video buffer 18.

Address multiplexer 68' selects which address generator shall source addresses for memory cycles to the graphics video buffer. Address multiplexer 68' is an 18 bit 2-to-1 multiplexer with the selection sourced from the memory sequencer 50 providing a single 18 bit address.

Address multiplexer 68" selects which half of the 18 bit address shall be output to the graphics video buffer 18. The graphics video buffer is made up of either DRAM or VRAM which uses a 9-bit multiplexed address. Address multiplexer 68" provides the proper 9-bit address with the selection sourced from the memory sequencer 50. The register interface means 36 provides the data path and primary interface control allowing either the system PC or the graphics controller access to the entire set of configuration registers (not shown) within the video processor 24. Data into and out of the register interface means 36 on bus 40 and 40' respectively are generated in the system PC and/or the graphics controller.

Still referring to FIGS. 2A and 2B, the video information processing means 30 includes the scaling means 70, output H/V cropping means 72 and dither and mode generator means 74. The scaling means 70 receives on its input high speed video information and scales or reduces the size of the information to fit a selected window on the computer graphics display. The output H/V cropping means 72 performs the final truncation necessary to size the scaled window to the exact pixel boundary desired in the computer operating system environment. This function is necessary since the scaling algorithm (details to be given hereinafter) does not have a single pixel granularity. The dither and mode generator means 74 provides dithering down (reduction) to RGB-16 or RGB-8 from RGB-24 bits per pixel. It should be noted that dithering is a well known high quality method of reducing the storage necessary for an image with minimum quality degradation. The conversion means 34 receives at its input YUV video signals and converts them to digital RGB and delivers them to the scaling means 70. The data into conversion means 34 are provided over respective conductors from data synchronization means 44 and input cropping means 42. The input cropping means 42 extracts the active video data from the digitized video source. There are portions of time (horizontal and vertical blanking intervals) where active video data is not present. The input cropping means 42 captures the active data and skips over the blanking interval where there is no data. The digitized interface means 46 provides the control necessary to interface directly to the electronics that decodes and captures data from the NTSC signal. The codec interface means 43 provides the control necessary to interface directly to a video codec (compressor/decompression). Data sync means 44 receives a 24-bit pixel bus that may be either red 8-bits, green 8-bits, blue 8-bits digitized, or Y (luminance) 8-bits, V-8-bits, U8-bits (chrominance) digitized. Luminance (Y) and chrominance (U, V) are basic components of PAL and NTSC television signal. This pixel data bus is sourced from either the codec means 25 or TV source means 23 (FIG. 1). All pixel data enters the video processor through this bus.

Two separate clocks are provided to the data sync means 44. The codec clock provides the timing at which to capture the input pixel bus and propagate a codec pixel. In the same manner, the digitizer codec provides the timing to capture the input pixel bus and propagate a digitizer pixel.

The codec interface means 43 receives only one input the CHSYNC or codec CHSYNC. This input provides the timing instructing the video processor that a full input line of codec video data has been completed. The vertical sync is always sourced from the video digitizer and the codec must synchronize to the video digitizer vertically.

The digitizer interface means 46 receives an input clock CLKIN driven directly from the phase lock loop (not shown) of the video decoder 15. The frequency of this input varies from 33 Mhz to 17 Mhz operating as the VCO output at the phase locked loop. DIVOUT is a programmably divided down signal which is output to the video decoder's phased lock loop as the reference signal to the phase locked loop. When in lock, DIVOUT's falling edge stays in constant phase with the horizontal sync of the video decoder. Sample is the clock to the video digitizer's analog to digital converter and commands the video digitizer to provide a digitized pixel to the video processor.

VERTIN is the vertical sync signal from the video digitizer. This signal acts as a reset to the video processor, instructing the video processor that the current field of video has completed and the next field is to begin processing.

Figure 4A:
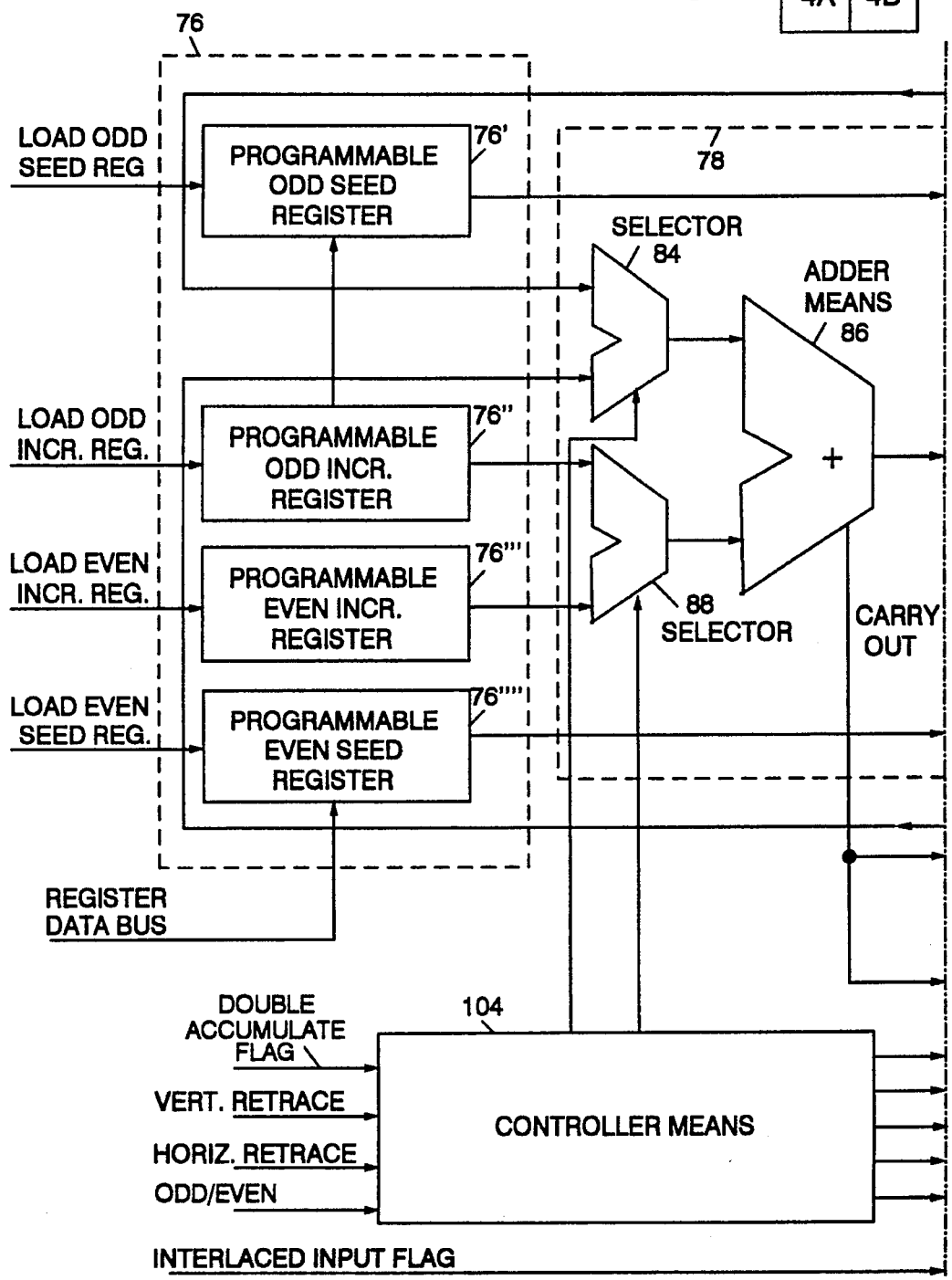
Figure 4B:
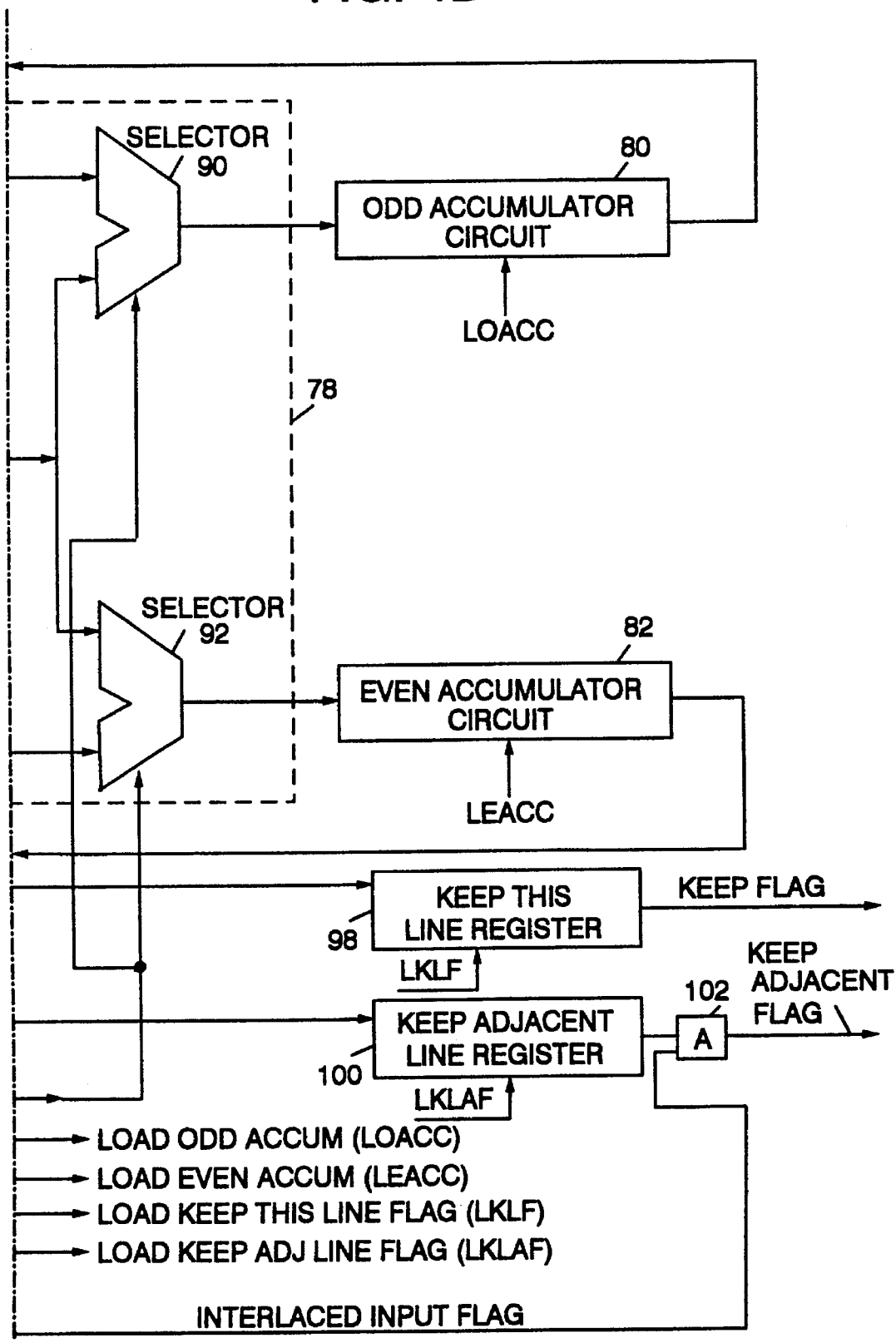

FIGS. 4A and 4B show a detailed circuit diagram for scaling means 70 (FIG. 2A). As stated previously, the scaling means receives full scale video information and adjusts the size of the information to fit a particular window within the computer graphic display means. The scaling means include a set of programmable registers 76 interconnected through respective conductors to mux adder means 78. The programmable registers include odd seed register 76', odd increment (INCR.) register 76", even increment register (INCR.) 76''' and even seed register 76''''. A conductor line labeled "register data bus" provides data for the registers and each of the registers is enabled by control signals on respective conductor line labeled "load odd seed register, load odd INCR. REG., load even INCR. REG. and load even seed REG.". The control signal on the control lines and the data signal on the data bus are provided by the application program being executed on the system PC. As used in this application, "seed" is a value which is used to initialize an accumulator. The set of programmable register 76 holds values for a desired scaling ratio.

The mux adder means 78 adds values from selective ones of the programmable odd and even increment registers 76", 76''' and output values which are stored in odd accumulator circuit 80 and even accumulator circuit 82. The outputs from the accumulator circuits are connected to selector 84 and the output from selector 84 is fed into adder means 86. Similarly, the output from the programmable odd and even increment registers 76' and 76''' are fed into selector 88. The output from selector 88 is fed into adder means 86. The output from adder means 86 is fed into selector 90 and selector 92. The output from selector 90 is fed into odd accumulator circuit 80 and the output from selector 92 is fed into even accumulator 82. The output from odd accumulator circuit 80 is fed into selector 84 and the output from even accumulator 82 is fed into selector 84. The carry-out output or overflow terminal of adder means 86 is fed into keep-this-line register 98 and keep adjacent line register 100. As will be explained subsequently, when the bit in the keep this line register 98 is true, the line in the video field which is being processed is kept. Similarly, when the bit in keep-adjacent-line register 100 is true and the signal labeled interlaced input flag is true, a signal is outputted from And circuit 102 indicating that a space has to be reserved in the video buffer to store the adjacent line when it arrives in the other field. Register 98 provides the signal "keep this line" flag (KEEP FLAG). This signal goes to the vertical portion of output h/v cropping 72 (FIG. 2A). When "keep this line" is false, the line of video is "cropped"(i.e., not passed on) to the frame buffer interface means 28 (FIG. 2B) of the video processor. When "keep-this-line" is true, the input line of video passes through the output h/v cropping is processed by the frame buffer interface means, 28. Register 100 goes to the memory sequencer, 50. When the memory sequencer finishes transferring a line of video data to the graphics video buffer, the memory sequencer commands the window address generator to calculate the address of the next sequential line of video in the graphics video buffer. If register 100, sourcing "keep adjacent line" is true, then the memory sequencer instructs the window address generator to calculate the address of the next sequential line of video in the frame buffer. If "keep adjacent line" is false, this additional address calculation is skipped. This is the means which adjacent field lines of video have reserved locations in memory providing the full frame based scaled image.

Still referring to FIGS. 4A and 4B, the signals for enabling the respective selectors, accumulators and keep registers are generated by controller means 104. In the preferred embodiment of this invention, controller means 104 includes a finite state machine running a program which will be described below. The outputs from the controller means 104 are labeled with appropriate names and acronyms. The acronyms are written on control lines of the components which the signals activate. By way of example, the signal labeled Load Odd Accumulate (Accum) is identified by the acronym LOACC. Similarly, the signal labeled Load Even Accumulate (Accum) is abbreviated LEACC. The same signal LEACC activates even accumulator circuit 82. The input conditions which activate the control means 104 are labelled on terminals at the left hand side of the controller means 104. A TV camera pick-up tube is used as the example for a video source since, historically, they were the first video sources around which TV standards were developed and subsequent video devices emulate their behavior.

In the preferred embodiment of the invention, the first input is labeled Double Accumulate Flag. This signal is activated when the user desires to use the frame based scaling mode. Likewise, the signal labeled Vertical Retrace is activated when the video source (such as a camera pick-up tube) is retracing from the bottom of the input image to the top, referred to as vertical retrace. As will be explained subsequently, the camera's beam does a vertical retrace before a field of data is scanned off of its target. The line labeled Horizontal Retrace is activated when the camera beam is doing a horizontal retrace in preparation for a horizontal scan. The horizontal retrace occurs when the beam is moving from the right side of the image to the left. During this period, no useful information is scanned in or written to the video window on the display screen.

Before discussing a flow chart for the logic used to drive the finite state machine or controller means (FIGS. 4A and 4B), a graphical representation of the interlaced scaling process will be discussed in FIG. 3. It is believed that this discussion will explain more clearly the theory and operation of applicants' scaling invention.

Figure 3:
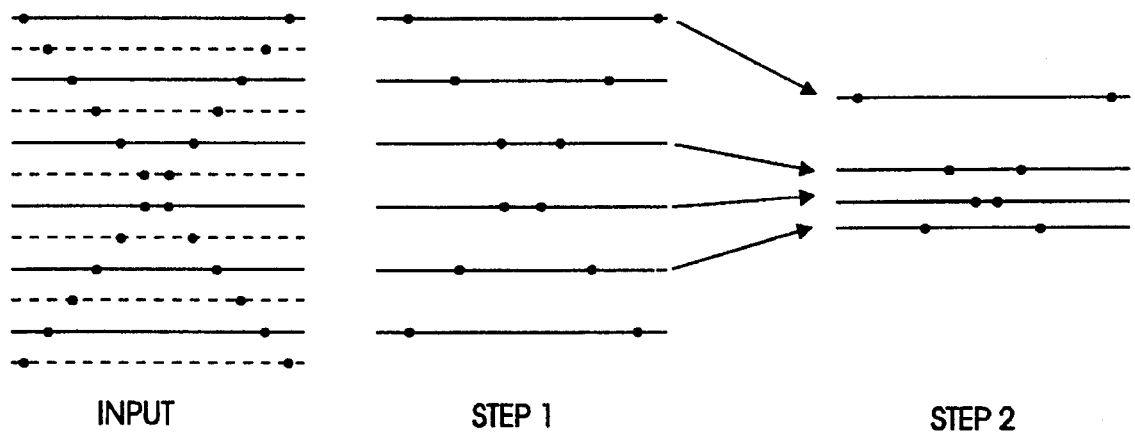
FIG. 3 shows a graphical representation of an interlaced video frame process in accordance with the teachings of the present invention.
Figure 3:
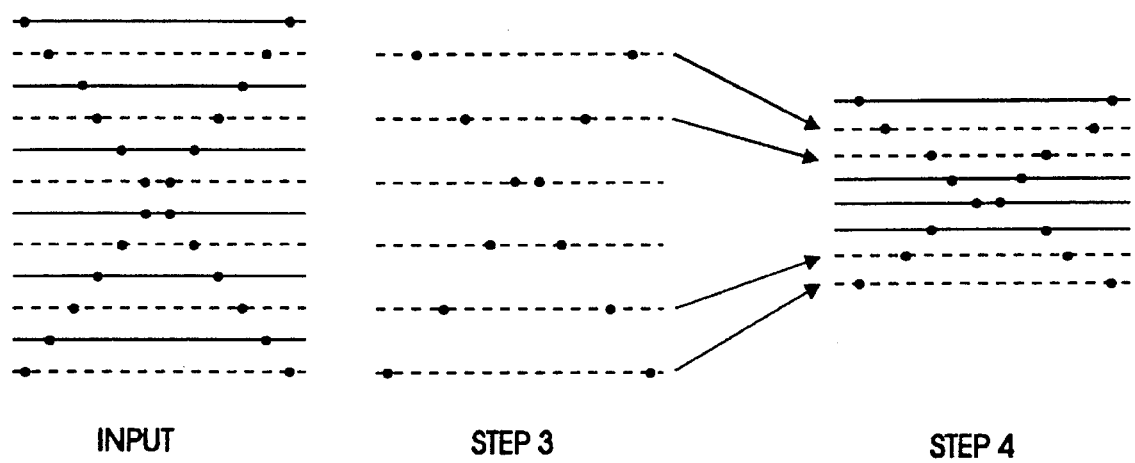

FIG. 3 shows the basic steps involved in scaling an image arriving from an interlaced source. Although the interlaced source sees the complete image (shown as a large "X" in the Input), it only supplies one field at a time. In step 1, lines from the first field are captured and presented to the scaler. The first field consists of every other line from the image, starting with the first line. The lines from the first field are shown as solid lines. In step 2, the scaler executes an algorithm to determine which lines from the first field should be discarded, and which lines from the first field should be kept and written into the display frame buffer. It is not only necessary to determine which lines should be kept, but where in the display frame buffer they should be written. It is not a matter of simply writing them one after the other in raster order. If it were, then the second line to be kept from the first input field would be written directly under where the first kept line of the input field was written. Instead, two frame buffer lines are skipped. This is to allow room for some kept lines from the yet to be supplied second field. The scaling algorithm must predict ahead of time which lines from the second field will be kept.

Step 3 shows the second field from the input frame which has been presented by the interlaced source. The lines from the second field are shown as dashed lines. They are captured and presented to the scaler. Again, the scaling algorithm has to determine which lines from the second field to discard and which to keep. Again, the scaler cannot just write the kept lines from the second field in straight raster order since that might overwrite lines in the frame buffer that were placed there by the scaler when it was processing the first field of the frame. In the figure, the first two lines and the last two lines of step 3 will be kept, but the algorithm must skip three lines before writing the last two lines into the frame buffer. Those three skipped lines were already provided from the first field as shown in step 2.

Observing the resulting image in the frame buffer in step 4, it is not obvious that the scaler had to process the input as two separate fields. It looks as if the input was presented as one complete frame. This is often times a desirable goal. Some scaling algorithms achieve this goal better than others. The scaling logic described in this invention supports several scaling algorithms. One of the supported algorithms is called a frame based scaling algorithm because it treats the input as if it had been supplied as one progressive frame instead of two interlaced fields. The frame based scaling algorithm uses a technique called double accumulation when determining which input lines to keep, to achieve the goal. Double accumulation will be described later.

Referring again to FIGS. 4A and 4B, to program the operation of the logic, a plurality of program registers are provided and identified by numeral 76. In particular, there are registers for keeping the initial odd and even seed values. In addition, there are registers for keeping the odd and even increment values. The accumulator values are used to control the scaling in each of the two fields independently. It should be noted that scaling is done both in the odd field and the even field which, when interlaced, forms the frame shown schematically in FIG. 3. It should also be noted that the common set of hardware shown in FIGS. 4A and 4B can be programmed to operate with different scaling algorithms which discard scan lines of video data to accomplish a desired scaling size.

Figure 7A:
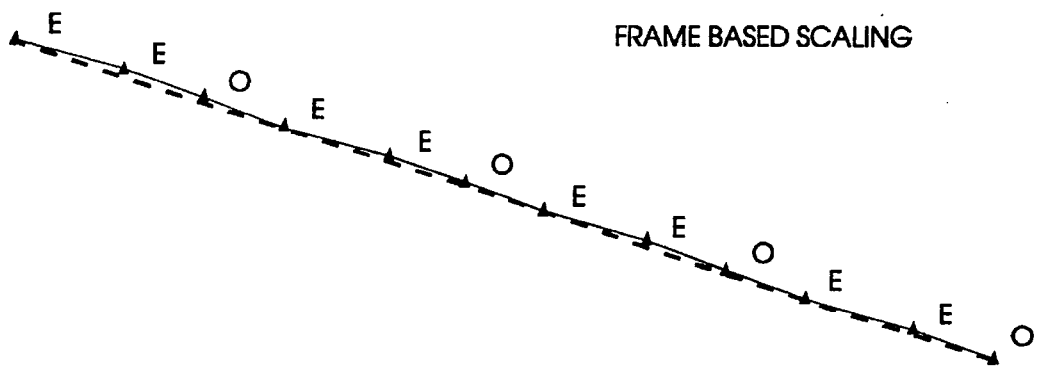
FIG. 7A–7C compare quality for three of the four scaling algorithms.
Figure 7B:
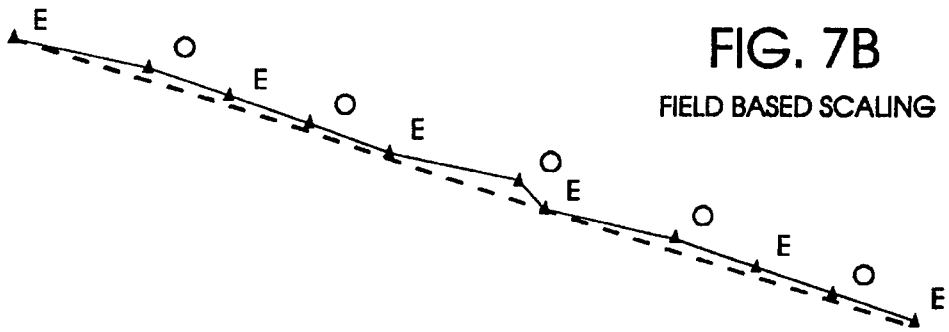
Figure 7C:
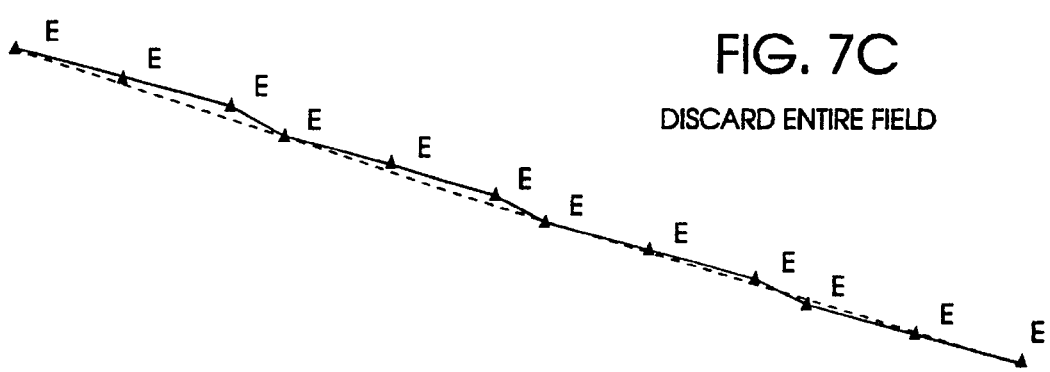

In the preferred embodiment of this invention, four different scaling algorithms with four different sets of tradeoffs are provided. FIG. 7 compares the quality of three of the four scaling algorithms. An image consisting of a diagonal line is scaled by a factor of 0.3. The original diagonal line is represented as a broken line and the image is shown as a solid line. The goodness or effectiveness of the scaling algorithm is measured by how close the image matches the original line. With a perfect scaling algorithm, the lines (image and original) would be superimposed on each other by a factor. The output pels are shown as triangular points and labeled as to whether they were derived from an even (E) or odd (O) input field. The dashed line shown represents the perfectly scaled output line. The vertical difference between the dashed line and the triangular prints represents the error. Frame based scaling is obviously the most accurate, and images scaled by this method will have the least "jaggies". Field based scaling guarantees a balanced number of even and odd scan lines being used to form the scaled image. This is important when the scaled output will be compressed by a hardware or software codec. Combing artifacts, introduced during the reinterlacing of motion images are less obvious using the field base method.

The discard entire field method, while not employable for all scale sizes, has the advantage of no combing artifacts.

The well known Bresenham algorithm for computing the coordinates of a diagonal line forms the basis for nearest neighbor scaling algorithms that determine which pels or lines to keep in order to obtain a particular scale factor of output to input dimension. In particular, it can be used for vertical scaling.

An accumulator is initialized to a particular starting (seed) value and then an increment is added to it every time a new line is processed. If the result of the addition does not result in a carry from the adder, the line is discarded; if a carry does result, the line is kept. Since the accumulator and adder is of a fixed size, after a carry, the accumulator will contain the fractional remainder of the sum.

As a very simple concrete example, consider that the adder will generate a carry for a sum >=1, the seed will be set to 0, and the increment to ⅓ in order to scale 3 down to 1. Then the accumulator would be initialized to 0 and then incremented to ⅓, followed by ⅔, followed by 3/3 where finally, a carry would be generated signifying that the third increment caused a carry and, therefore, a line keep. The proceeding two increments did not cause a carry and, therefore, did not cause keeps for their associated lines. As a result, only 1 out of the three lines would be kept, resulting in a scale factor of ⅓.

This invention exploits the observation that by initializing various parameters in a programmable scaler, the scaler can be caused to function as one of several different kinds of scalers. In one case, the actual operation of the scaler is further modified in a simple manner to achieve a more accurate scaling result.

The fact that a progressive frame is actually supplied as two interlaced fields has two separate consequences. One is that lines from the other field are not directly available to contribute to the algorithm that determines which input lines are kept and which are discarded. The second is that, when written to the frame buffer and finally displayed, lines from the current field may be interspersed with lines from the other currently unavailable field, so space must be left for those unavailable lines.

FIG. 6 shows examples of the values that would need to be loaded into the scaling configuration registers in order to configure the scaler to implement each of the algorithms described below. The figure consists of a four column table. Each column contains the five pertinent parameters that must be programmed to achieve the designated scaling algorithm labeled in the column heading. The four algorithms are 1) Frame Based, 2) Field Based, 3) Discard Field and 4) Keep Field. The five pertinent parameters are made up of the increment values, the seed values and flag that indicates whether double accumulation should be performed. In particular, these five parameters are the even field increment INCR(EVEN), the odd field increment INCR(ODD), the seed value for the even field SEED(EVEN), the seed value for the odd field SEED(ODD) and the DOUBLE ACCUMULATE FLAG. For example, if Frame Based Scaling is desired, then the even and odd increment registers should both be loaded with a value equal to the scale factor (SF), the even seed register should be loaded with a value equal to one minus the value loaded into the even increment register, the odd seed register should be loaded with a value of zero, and the Double Accumulate Flag should be loaded with a value corresponding to True. The values shown in the table are normalized to one; the actual values loaded into the particular registers would be normalized to the modulo size of the adder. The values shown in the table for the even seed and odd seed are examples that will work. There exist other values for the seeds that will produce equivalent, or different but usable results. As used in the figure, FRAC means fractional portion.

Algorithm 1 - Frame Based Scaling (For 0<=Scale Factor <=1)

Although this algorithm works with typical interlaced fields, it treats them in a special way so as to convey the properties of a progressive frame. Remember that an interlaced field presents every other line of a progressive frame and it therefore takes a sequence of an even and odd field, each with half of the lines of the frame missing, to reproduce a progressive frame.

As is typical of the other algorithms, to process a line, Algorithm 1 adds a particular increment to an accumulator and performs a line keep operation based on whether a carry took place out of the adder. However, unique to this algorithm, it then adds the increment to the accumulator a second time, but ignores the possible carry out of the adder. The two successive additions of an increment to an accumulator are referred to here as Double Accumulation. The second addition is done to account for the input line from the other field of the frame. Although that input line is not physically available at the present time, since it is not in the present field, and therefore cannot yet be kept if necessary, it still is counted, just as it would have been if a progressive frame had been provided instead.

Looking at the concept from a different perspective, if a progressive frame had been supplied, each successive line of the frame would cause an increment to be added to an accumulator and the line would be kept if a carry resulted from the addition. The scaling is a function of the incrementing. Even, if for some reason, an input line would not be allowed to be kept until sometime later, it would be important that it was counted. When a first line is counted, a second line starts out with the accumulator at a different value than if that first line had not been counted, and so it affects whether that second line will be kept. Whether that second line is kept is not dependent on whether that first line is kept; it is dependent on whether that first line is counted. When fields are supplied instead of frames, every other line from the frame is skipped until the next field, but all lines from the frame need to be counted each time a field is processed.

It is allowable for the two fields that make up a frame to be scaled with different scale factors in order to create a special effect. If that effect is not required, an engineering simplification can be made by treating the increment for the even field and the increment for the odd field as one in the same.

Algorithm 2 - Field Based Scaling (For 0<=Scale Factor <=1)

This algorithm scales each field as if the other field did not exist, other than to allow room for lines from the other field in the frame buffer. In the counting process, only the lines from the current field are counted. The two fields are treated identically, other than for a possible offset in the seed value of one field with respect to the other to more evenly spatially disperse which lines are kept. Each field contributes the same number of lines to the output.

Algorithm 3 - Discard Field Scaling (For 0<=Scale Factor <=0.5)

The first thing this algorithm does is to discard one of the two fields by setting the increment value for that field to zero. By always adding zero to an accumulator, a carry is never generated so no lines are kept from that field. It does not actually matter what the accumulator for that field is initialized to by that field's seed. Like Field Based Scaling, the other field is independently scaled. Consideration to the discarded field is only given by adjusting the increment for the other field to take into account that the discarded field has already caused an effective scaling of 2 to 1. That is also why the applicable range of scale factors for this algorithm is limited. Keep in mind that the increment is inversely related to the scale factor.

Algorithm 4-Keep Field Scaling (For 0.5<=Scale Factor <=1)

The first thing this algorithm does is to completely keep one of the two fields by setting the increment value for that field to one. By always adding one to an accumulator, a carry is guaranteed to be generated so all lines are kept from that field. Like the preceding algorithm, it does not actually matter what the accumulator for that field is initialized to by that field's seed. Like the two preceding algorithms, the other field is independently scaled. Consideration to the kept field is only given by adjusting the increment for the other field to take into account that the kept field has diminished how much more scaling can be done by discarding lines from the other field. That is also why the applicable range of scale factors for this algorithm is limited.

Figure 5A:
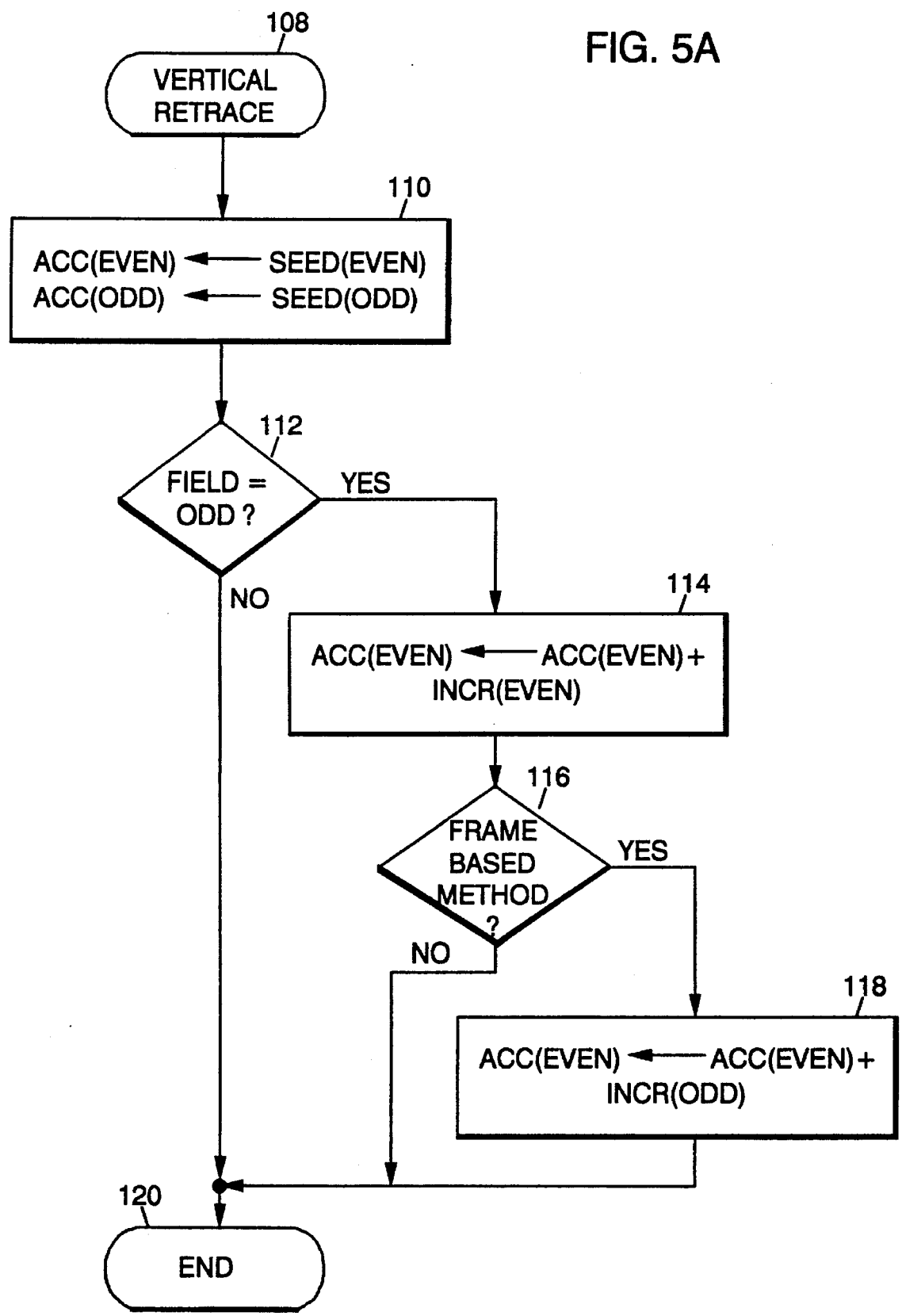
FIGS. 5A and 5B show flow charts of the program used in the scaling circuitry controller.
Figure 5B:
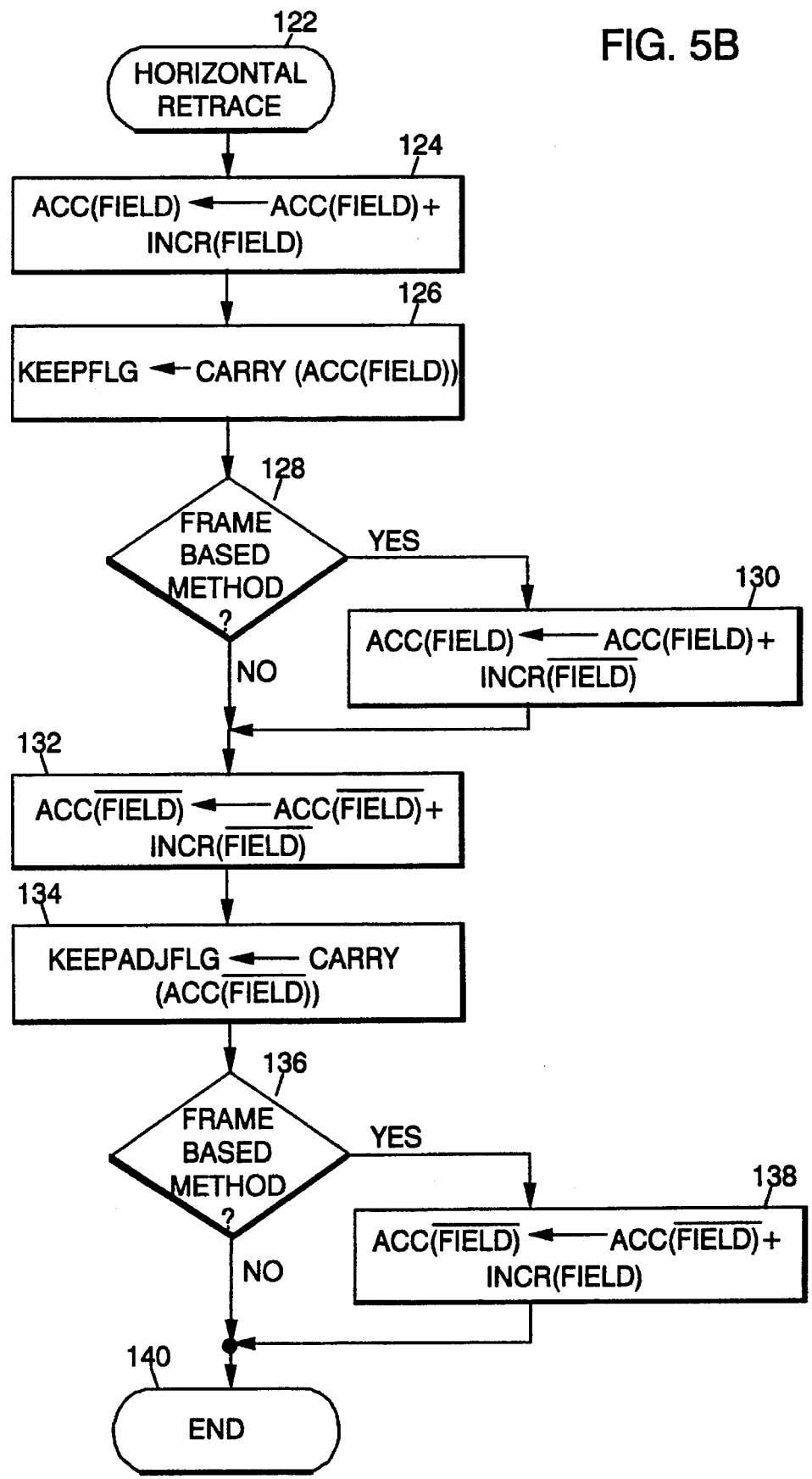

FIG. 5A shows a flow chart of the logic which is executed in the state machine (FIGS. 4A and 4B) when the video source is performing a vertical retrace. FIG. 5B shows a flow chart of the logic which is executed for each input line delimited by a horizontal retrace. As a general rule, it should be noted that when the flag in the keep this line register (FIGS. 4A and 4B) is true, i.e., logical 1, the current input line is to be saved in the frame buffer at the next available slot. If the keep adjacent line flag (FIGS. 4A and 4B) is true, this indicates that the next available slot in frame buffer will be or will have been filed with a line from the other field.

With this in mind and referring to FIG. 5A in particular, terminal 108 signifies the program entering the algorithm when the video source is in vertical retrace. To indicate this condition, a signal is generated from the source and placed on the line labeled Vertical (Vert) Retrace (FIGS. 4A and 4B). The program then enters block 110 in which a two step process is performed; namely, the even accumulator is initialized to the even seed register and the odd accumulator is initialized to the odd seed register. This is done by the finite state machine (shown as controller means 104, FIGS. 4A and 4B) generating the appropriate signals so that the data in the even seed register is transferred to the even accumulator and the information in the odd seed register is transferred to the odd accumulator. The program then descends into decisional block 112. In block 112, the program tests to see if the current field it is working in is an even field or an odd field. If it is an even field, the program descends into the End terminal 120. If it is an odd field, the program descends into block 114 where the even accumulator is incremented to take account of the fact that the odd field input lines start after the even field input lines. The program then descends into decisional block 116. In block 116, the program determines if the frame based method is being used by testing to see if the Double Accumulate flag is set. If it is not, the program descends into the End terminal 120. Otherwise, the program descends into block 118 where the even accumulator is once again incremented. Although the second accumulation of Double Accumulation theoretically involves using the increment value associated with the other field since it is accounting for input lines from the other field, as a practical matter, the scale factors for the two fields might be assumed to be identical in the frame based method where this applies, and so the simplification of adding the increment associated with the same field as the accumulator rather than the opposite field might be made. The program then descends into the End terminal 120. The End terminal 120 only signifies that the preliminary processing in preparation for receiving lines from the current field is done.

Having completed the start of field preliminaries, the logic waits for horizontal retrace signifying the start of the first active line of video to be scaled is arriving. The algorithm in FIG. 5B is then executed for that and all subsequent active lines of the field.

Referring now to FIG. 5B, as soon as the horizontal retrace signal is asserted, the logic descends from terminal 122 into block 124 in which the contents of the accumulator associated with the current field is added to the increment for the current field and stored back in itself. This is done by the finite state machine activating the respective control lines in FIGS. 4A and 4B so that the particular accumulator is loaded with the contents of the particular increment register plus the value that was in that accumulator.

The program descends into block 126 where it keeps the present line if there was an overflow from the adder in previous operation 124. The program then descends into block 128. In block 128, the program tests to see if the Double Accumulate flag is set. If it is not, the program descends into block 132. Otherwise, the program descends into block 130 where the current field accumulator is once again incremented. The same explanation for choice of incrementer applies here as it did for block 118 of FIG. 5A. The program then descends into block 132 without concerning itself with the status of the carry out of the adder. There, the accumulator for the other field is incremented by the increment value associated with the other field. The program descends into block 134 where, if there was an overflow from the adder in previous operation 132, it sets the Keep adjacent flag so that when the current line is finished being processed (whether it is stored in the frame buffer or discarded) room will be made in the frame buffer for an output line from the other input field. The program then descends into block 136. In block 136, the program determines if the frame based method is being used again by testing to see if the Double Accumulate flag is set. If it is not, the program descends into terminal 140. Otherwise, the program descends into block 138 where the other field accumulator is once again incremented. The same explanation for choice of incrementer applies here as it did for block 118 of FIG. 5A. The program then descends into terminal 140 without concerning itself with the status of the carry out of the adder. The End terminal 140 only signifies that the preliminary processing in preparation for receiving an active line from the current field is done. The algorithm described by FIG. 5B is repeated for the remaining active lines of the field.

In operation, the scaling circuit is such that, after a line from the current field is being processed to determine whether it will be discarded or kept, a determination is made about whether the next line in the frame buffer will come from the other field. This operation is required to reserve storage in the video buffer for scan lines that will be kept from the other field. A programmable counter (FIGS. 4A and 4B) with overflow detection is used for scaling the video data. The logic operation is cycled once each horizontal blanking interval (where there is no video information) to determine if the next scan line received will be processed or discarded. Since the scan line that will appear adjacent to the current scan line may come from the other field (262.5 for NTSC scan lines apart) a decision must be before the next scan line in the current field is processed as to whether the scan line in the other field will be processed or discarded so that the area in the video memory can be reserved for that scan line. This allows the scaled picture to maintain maximum image resolution by preserving video data from both fields, even though it processes video data one field at a time.

Depending upon the various sources and their respective image quality, the desired scaling factor (SF) and the correlation of visual information between the odd and even field, any one of the plurality of modes shown and described above may prove to have the best picture quality.

For all active lines, accumulator values plus increment values are used to generate the proper flag value.

Each time the addition results in a carry (Sum >=1), a line is kept (that is, processed). By way of example, putting a value of ⅓ in the increment results in ⅔ of the lines in the field being discarded, and ⅓ of the lines of that field being displayed. In addition, the seed values determine how many lines are discarded before the first line from respective fields are kept. For example, if frame base scaling is desired with a scale factor of ⅕, then set the odd increment equal to the even increment equal to ⅕, the even seed to ⅘ and the odd seed equal to 0. This will result in line 0, 5, 10, 15, 20, . . . being kept. Thus, since the algorithm is exercised during the vertical retrace and the horizontal retrace, by the time the scan line data is being received, this circuit determined if the scan line in the current field should be processed or discarded, and if space must be reserved then for a scan line from the other field.

Having thus described our invention, what we claim as new and desire to secure by Letters Patent is:

1. A device for using in a multi-media workstation comprising:

a video buffer means for storing data to be displayed;

a graphic controller for providing data signals in response to an application program executed on the workstation to alter information in the video buffer; and a video processor coupled to the video buffer means and the graphic controller; said video processor receiving lines in a first field of a pair of interleaved fields, representing a full motion video image, selecting some of said lines for inserting in the video buffer means, simultaneously reserving spaces adjacent to inserted lines in said video buffer means whereat selected lines from a not-yet received one of the pair of interleaved fields are to be stored, receiving a second field of the pair of interleaved fields and inserting in reserved spaces lines selected from said second field wherein lines saved in said buffer means represent a scaled image of the full motion video image.

2. The device of claim 1 further including a computer system having a bus coupled to the graphic controller.

3. The device of claim 2 further including an interface circuit arrangement coupled to the video buffer means; and a graphic display device coupled to the interface circuit arrangement.

4. The device of claim 1 wherein the first field includes even lines.

5. The device of claim 4 wherein the second field includes odd lines.

6. A device for using in a multi-media workstation comprising:

a video buffer means for storing data to be displayed;

a graphic controller for providing data signals in response to an application program executed on the workstation to alter information in the video buffer; and a video processor means, including an address generation means for generating address signals representing addresses in the video buffer means with said addresses defining an address representative of a window on a display or in off-screen memory, a selector circuitry for responding to the address signals and outputting selected ones of said address signals on an address bus of said video buffer means, a FIFO buffer for storing scaled video information, a memory sequencer circuit coupled to the FIFO buffer and the address generation means with said memory sequencer circuit generating control signals for advancing address generators and for causing data to be transferred from the FIFO buffer onto a data bus of the video buffer means and a scaling means for scaling video information coupled to the FIFO buffer, coupled to the video buffer and the graphic controller with said video processor means being responsive to full-motion video signals to select lines simultaneously from an odd field and an even field of frames in said full-motion video signals and storing selected lines into the video buffer means.

7. The device of claim 6 wherein the scaling means includes a plurality of registers for storing data related to at least one desired scale factor;

at least one accumulator for holding current count values;

an adder means, coupled to the registers and the at least one accumulator, for adding the data selected from respective ones of said registers and the data selected from the at least one of said accumulator and store the sum back into the same accumulator;

a pair of registers coupled to an overflow terminal of said adder means; and a controller means for generating signals for controlling the adder means, the accumulator and the pair of registers.

8. The device of claim 6 wherein the plurality of registers are programmable.

9. In a multi-media workstation having a display device and a computer executing a software program which partitions a display screen of the display device into a plurality of windows and causes computer graphics and/or data to be inserted and displayed in selected ones of said windows, a module for receiving full-scale motion video information processing the video information and causing said video information to be displayed simultaneously with the computer graphics information on the screen of said display device, said module comprising:

means for generating address signals representing addresses in a video buffer whereat the windows are being defined;

a selector means for outputting selected ones of said address signals onto an address bus of said video buffer;

a FIFO buffer for storing scaled video information;

a memory sequencer means coupled to the FIFO buffer; said memory sequencer means being operable to generate control signals for advancing the means for generating address signals and for transferring data from the FIFO buffer onto a data bus of said video buffer; and a scaling means for receiving the video information and selecting lines for storing in said video buffer from a first field of a video frame being presently received and reserving space in said video buffer for storing lines from a second field of the video frame to be received at a subsequent time.

10. In a multi-media workstation having a display device and a computer executing a software program which partitions a display screen of the display device into a plurality of windows and causes computer graphics and/or data to be inserted and displayed in selected ones of said windows, a circuit arrangement for scaling full motion video information so that said full motion video information are being reduced to a desired size for fitting into windows on said screen, said circuit arrangement comprising:

a plurality of registers for storing data;

a pair of accumulators for holding count values;

an adding means coupled to the registers and the accumulators and operable to add the data selected from respective ones of the plurality of registers and the data selected from respective ones of said accumulators and store the sum back into a selected accumulator;

a pair of flag registers coupled to an overflow terminal of said adder means; said registers operable to store information indicating which lines of a video frame are to be stored; and a control means for generating signals to control the adder means, the accumulator and the flag registers.

11. The circuit arrangement of claim 10 wherein the plurality of registers are programmable.

12. The circuit arrangement of claim 11 wherein the plurality of programmable registers are loaded with data associated with an odd field and an even field of a full motion video frame.

13. The circuit arrangement of claim 10 wherein the adder means includes an adder having an output terminal, a pair of input terminals and an overflow terminal;

a first selector circuit coupled to one of the pairs of input terminals;

a second selector circuit coupled to another one of the pairs of input terminals;

a third and a fourth selector circuit coupled to the output terminal.

14. In a multi-media workstation having a display device and a computer executing a software program which partitions a display screen of the display device into a plurality of windows and causes computer graphics and/or data to be inserted and displayed in selected ones of said windows, a method for scaling full motion video information so that said full scale video information are being reduced in size to fit into windows of said screen; said method comprising the steps of:

(a) providing a source for supplying full-scale video information which is to be scaled;

(b) providing an adder and at least one accumulator for keeping tally of a running count of lines of video information to determine which lines are to be kept;

(c) during a video source vertical retrace period, if a second field of a two-field video frame is being received, a first adjustment is made to the running count to generate a first adjusted count which is kept in the accumulator, and if frame based scaling is being selected, a second adjustment is made to the first adjusted count; and (d) thereafter, during each video source horizontal retrace period determining if lines from the presently received field of the frame and the other field of the frame received at another time are to be saved in a buffer.

15. The method of claim 14 wherein the running count in the accumulator is adjusted twice for each video line kept in step (c).

16. The method of claim 15 wherein if after a first adjustment there is a carry out from the adder, a video line causing the carry out is kept.

17. The method of claim 14 wherein if after a second adjustment there is a carry out from the adder no line or reserved space is saved in the buffer.

18. The method of claims 14 further including the step of if lines are to be saved as a result of executing step (c), inserting presently received lines in the video buffer and reserving spaces for storing lines from the other field at another time.

19. In a multi-media workstation having a display device and a computer executing a software program which partitions a display screen of the display device into a plurality of windows and causes computer graphics and/or data to be inserted into a video buffer and then displayed in selected ones of said windows, a module for processing full-scale motion video information and causing said video information to be displayed simultaneously with the computer graphics information on the screen, said module comprising:

a first interface means for receiving the full-scale motion video information;

a second interface means including at least one register for receiving and storing information from the computer;

a third interface for coupling to the video buffer;

a controller means, responsive to control signals provided by a device which generates the full-scale video information, for executing a set of programmed instructions and outputting at least one control signal; and counting means responsive to the at least one control signal to combine a present count in said counting means with a value set in the at least one register by the computer and if an overflow condition occurs as a result of combining the present count with the value outputting a "save flag" indicating a line of full-scale video information being received is to be saved for display on the display screen.

20. A method for scaling video information for displaying on a windowed display screen comprising the steps of:

receiving a first set of lines of data from a first field of a pair of interleaved fields representing a full motion video image;

selecting some of said first set of lines for saving in a buffer in which a scaled video image is reproduced for displaying on the windowed display screen;

reserving spaces, adjacent to saved lines, in which lines selected from a not yet arrived field of said pair of interleaved fields are to be saved;

receiving a second set of data lines from the arrived field of said pair of interleaved fields;

selecting some of said second set of lines and inserting in reserved spaces wherein lines saved in the buffer represent a scaled image of the full motion video image.

21. An apparatus for scaling video information for displaying on a windowed display screen comprising:

means for receiving a first set of lines of data from a first field of a pair of interleaved fields representing a full motion video image;

means for selecting some of said first set of lines for saving in a buffer in which a scaled video image is reproduced for displaying on the windowed display screen;

means for reserving spaces adjacent to saved lines in which lines selected from a not yet arrived field of said pair of interleaved fields are to be saved;

means for receiving a second set of data lines from the arrived field of said pair of interleaved fields;

means for selecting some of said second set of lines and inserting in reserved spaces wherein lines saved in the buffer represent a scaled image of the full motion video image.

\* \* \* \* \*